United States Patent
Avery, Jr.

(10) Patent No.: US 6,351,703 B1
(45) Date of Patent: Feb. 26, 2002

(54) ENGINE CONTROL WITH PROGRAMMABLE AUTOMATIC STARTING

(75) Inventor: Richard M. Avery, Jr., Bloomfield, MI (US)

(73) Assignee: Detroit Diesel Corporation, Detroit, MI (US)

(*) Notice: Subject to any disclaimer, the term of this patent is extended or adjusted under 35 U.S.C. 154(b) by 0 days.

(21) Appl. No.: 09/587,967

(22) Filed: Jun. 6, 2000

(51) Int. Cl.[7] .............................................. F02N 11/08
(52) U.S. Cl. .................... 701/112; 701/113; 123/179.2; 123/179.4; 307/10.4; 307/10.6
(58) Field of Search ................................ 701/112, 113; 123/179.2, 179.3, 179.4; 307/10.4, 10.6; 290/38 C

(56) References Cited

U.S. PATENT DOCUMENTS

| | | | |
|---|---|---|---|
| 2,698,391 A | 12/1954 | Braden et al. | |
| 2,836,732 A | 5/1958 | Newlin | |
| 2,975,296 A | 3/1961 | Dominiguez-Rego | |
| 3,696,333 A | 10/1972 | Mott | |
| 4,200,080 A | 4/1980 | Cook et al. | |
| 4,231,073 A | 10/1980 | Suchko | |
| 4,296,334 A | * 10/1981 | Wong | 290/37 R |
| 4,392,059 A | 7/1983 | Nespor | |
| 4,413,595 A | 11/1983 | Potts, Jr. | |
| 4,453,506 A | 6/1984 | Ueda et al. | |
| 4,454,843 A | 6/1984 | Uchida et al. | |
| 4,466,392 A | 8/1984 | Uchida et al. | |
| 4,479,063 A | 10/1984 | Ueda et al. | |
| 4,606,307 A | 8/1986 | Cook | |
| 4,665,370 A | 5/1987 | Holland | |
| 4,875,443 A | * 10/1989 | Sano et al. | 123/179.3 |
| 4,901,689 A | 2/1990 | Cummins et al. | |
| 4,930,467 A | 6/1990 | Masuda et al. | |
| 5,072,703 A | 12/1991 | Sutton et al. | |
| 5,129,376 A | 7/1992 | Parmley | |
| 5,275,011 A | * 1/1994 | Hanson et al. | 62/157 |
| 5,317,998 A | 6/1994 | Hanson et al. | |
| 5,349,931 A | 9/1994 | Gottlieb et al. | |
| 5,377,641 A | 1/1995 | Salazar | |
| 5,451,820 A | 9/1995 | Gotoh et al. | |
| 5,653,659 A | 8/1997 | Kunibe et al. | |
| 5,734,239 A | 3/1998 | Turner | |
| 5,764,469 A | 6/1998 | Slepian et al. | |
| 5,951,440 A | 9/1999 | Reichlinger | |

* cited by examiner

Primary Examiner—Andrew M. Dolinar
(74) Attorney, Agent, or Firm—Brooks & Kushman PC

(57) ABSTRACT

A system and method for controlling an internal combustion engine having an electronic engine controller to automatically start the engine at a programmable day/date and time include determining a current day/date and time, comparing the current day/date and time to a day/date and time previously stored in the programmable memory for automatically starting the engine, determining whether current conditions are acceptable for automatically starting the engine, and controlling the engine to automatically start the engine beginning at the programmed day/date and time. In one embodiment, a remotely located computer transmits a signal to coordinate automatic starting of a plurality of engines, such as in a truck/bus fleet, or for construction equipment at a construction site. Security features are provided to reduce the possibility of unauthorized use/theft of a vehicle or other equipment after being automatically started. Security features may include limiting distance traveled, limiting maximum speed, and/or limiting any movement of the vehicle/equipment. Engine torque may be reduced or the engine automatically stopped when a security violation is triggered.

29 Claims, 3 Drawing Sheets

_US 6,351,703 B1_

ENGINE CONTROL WITH PROGRAMMABLE AUTOMATIC STARTING

TECHNICAL FIELD

The present invention relates to a system and method for automatically starting an engine based on a programmable date and time.

BACKGROUND ART

Diesel engines have a wide variety of applications including passenger vehicles, marine vessels, earth-moving and construction equipment, stationary generators, and on-highway trucks, among others. Electronic engine controllers provide a wide range of flexibility in tailoring engine performance to a particular application without significant changes to engine hardware. The use of a full authority electronic controller provides a number of capabilities for enhancing engine operation, tailoring engine performance to a particular application, owner, or operator, and providing features which reduce or eliminate undesirable characteristics typically associated with diesel engines, such as noise, smoke, or difficult starting. One feature which has been provided for various types of engines, including diesel engines, is the ability to automatically start and/or stop the engine based on various engine or ambient parameters. Similarly, a number of systems which provide automatic starting of an engine using a remote control have been developed.

For diesel engines in particular, the engine operator may not own the engine and therefore may not be responsible for fuel costs or engine maintenance. However, engine/vehicle owners seek to provide conveniences or amenities for the operators or drivers because it is often difficult to attract and retain drivers in a competitive job market. For these applications, automatic start/stop features may be used to balance the fuel economy interests of the owner while providing conveniences to the operator, such as automatically starting and stopping the engine while the driver is parked to keep the cab temperature comfortable. Likewise, various vehicle parameters, such as battery voltage, fuel temperature, or oil temperature may be used to automatically start and stop the engine to avoid difficult starting in cold weather applications.

Diesel engine/vehicle owners may often have a fleet of vehicles, such as on-highway trucks, buses, and/or industrial and construction equipment which may be desirable to start at about the same time. For example, it may be desirable to start a fleet (or some portion thereof) of buses on Monday morning before the first scheduled routes, particularly in cold climates. However, safety and security considerations must be taken into account to prevent undesired starting and/or vehicle theft.

DISCLOSURE OF INVENTION

An object of the present invention is to provide an improved diesel engine control system and method which may be used to automatically start a diesel engine at a programmable day/date and time. In carrying out this object and other objects and features of the present invention, a method for controlling an internal combustion engine having an electronic engine controller in communication with a starter motor and a plurality of fuel injectors is provided. The electronic engine controller preferably includes a programmable memory for storing instructions and parameters for controlling the engine. In one embodiment, the method includes determining a current day and/or date and time, comparing the current day and/or date and time to a day and/or date and time previously stored in the programmable memory for automatically starting the engine, determining whether current conditions are acceptable for automatically starting the engine, and controlling the starter motor and fuel injectors to automatically start the engine beginning at the previously stored day and/or date and time for automatically starting the engine and continuing for a predetermined time thereafter while the current conditions are acceptable for automatically starting the engine or until the engine has started.

In other embodiments according to the present invention, methods for controlling a plurality of vehicles to automatically start the engines at a programmable day and/or date and time are provided. In these embodiments, a representative method includes transmitting a signal from a remotely located computer at a programmable day and/or date and time to the plurality of vehicles to enable the plurality of engines to start. For each engine; determining whether conditions are acceptable for automatically starting the engine; and repeatedly attempting to start the engine while conditions are acceptable for automatically starting the engine until the engine starts or a predetermined number of attempts have been completed. The remotely located computer may transmit a signal enabling one or more engines to start at a day/date and time previously programmed in the engine control module. Alternatively, or in combination, the remotely located computer may transmit a signal including a future day/date and time which is stored or programmed into the engine controller(s) for automatically starting one or more engines at a programmed date and/or time.

The present invention preferably includes security features to inhibit theft or unauthorized operation of vehicles or equipment which have been automatically started. In one embodiment, the present invention includes preventing the vehicle or equipment from moving by stopping the engine when an attempt is made and/or limiting maximum speed to a predetermined or programmable level. In another embodiment, distance traveled by the vehicle/equipment is limited to a predetermined area as measured from a remotely located computer, or from an authorized area. Distance traveled may be ascertained by the engine/vehicle controller, by a remotely located computer, or both using transmitted signals or a GPS system, for example.

The present invention provides a number of advantages relative to previous automatic/remote starting systems and methods. For example, the present invention provides systems and methods for automatically and/or remotely starting one or more engines/vehicles at a programmable day/date and time. The present invention allows an engine to be automatically started based on a signal received from a remotely located computer. The present invention provides safety and security features to prevent undesired engine starts and/or unauthorized operation of vehicles/equipment after automatic starting.

The above advantages, and other advantages, objects, and features of the present invention are readily apparent from the following detailed description of the best mode for carrying out the invention when taken in connection with the accompanying drawings.

BEST MODE FOR CARRYING OUT THE INVENTION

Figure 1:
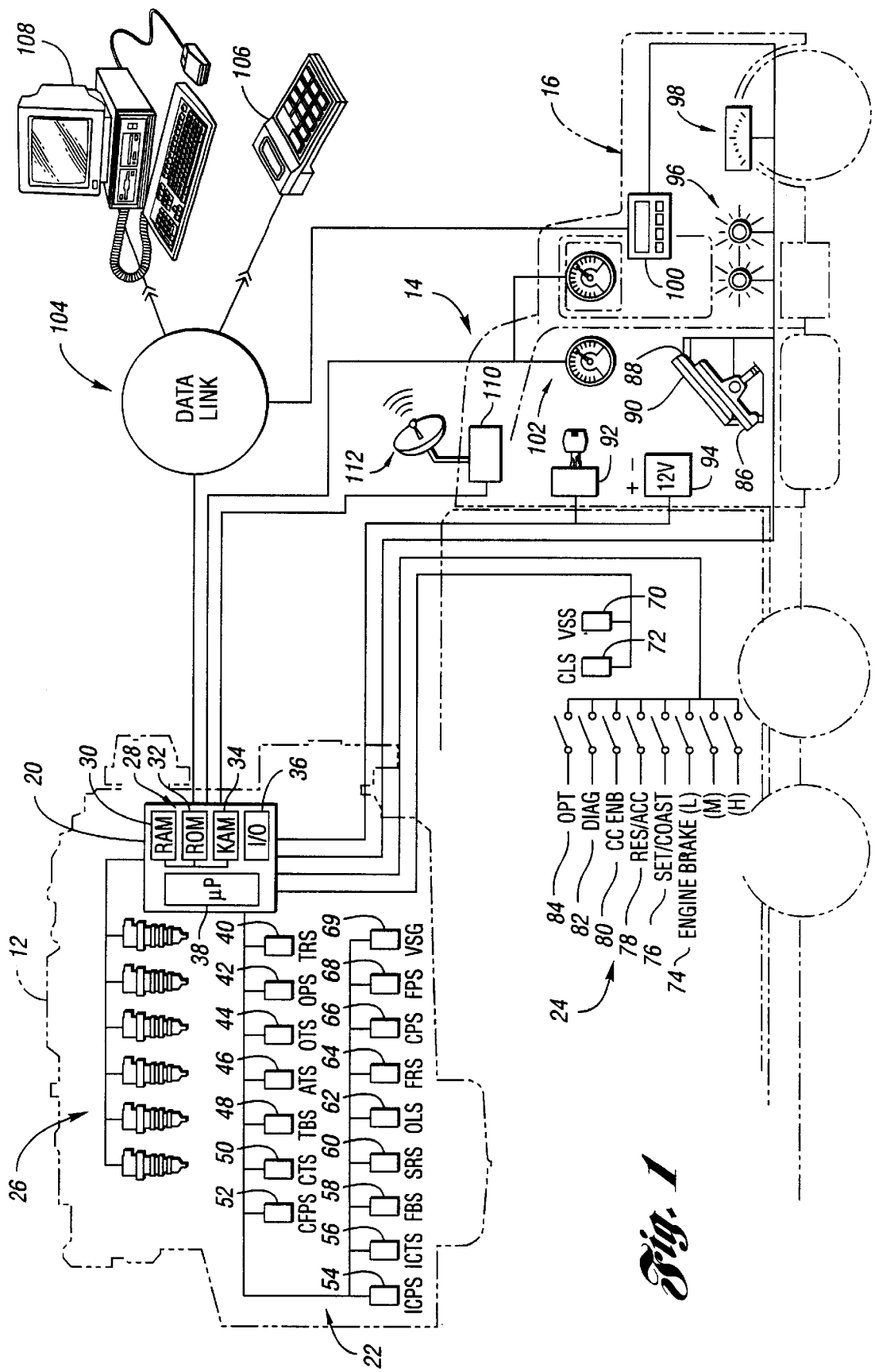
FIG. 1 is a schematic/block diagram illustrating operation of a system or method for automatically starting an engine according to one embodiment of the present invention.

FIG. 1 provides a schematic/block diagram illustrating operation of a system or method for automatically starting an engine according to one embodiment of the present invention. A system 10 includes an internal combustion engine, such as a diesel engine 12, which may be installed in a vehicle 14 depending upon the particular application. In one embodiment, vehicle 14 includes a tractor 16 and semi-trailer 18. Diesel engine 12 is installed in tractor 16 and interfaces with various sensors and actuators located on engine 12, tractor 16, and semi-trailer 18 as described in further detail below. In other applications, engine 12 may be used to operate industrial and construction equipment, or in stationary applications for driving generators and/or pumps and the like.

An electronic control module 20 receives signals generated by engine sensors 22 and vehicle sensors 24 and processes the signals to control engine and/or vehicle actuators such as fuel injectors 26. Engine control module (ECM) 20 preferably includes computer-readable storage media, indicated generally by reference numeral 28 for storing data representing instructions executable by a computer to control engine 12. Computer-readable storage media 28 may also include calibration information in addition to working variables, parameters, and the like. In one embodiment, computer-readable storage media 28 include a random access memory (RAM) 30 in addition to various non-volatile memory such as read-only memory (ROM) 32, and keep-alive memory (KAM) 34. Computer-readable storage media 28 communicate with a microprocessor 38 and input/output (I/O) circuitry 36 via a standard control/address bus. As will be appreciated by one of ordinary skill in the art, computer-readable storage media 28 may include various types of physical devices for temporary and/or persistent storage of data which includes solid state, magnetic, optical, and combination devices. For example, computer readable storage media 28 may be implemented using one or more physical devices such as DRAM, PROMS, EPROMS, EEPROMS, flash memory, and the like. Depending upon the particular application, computer-readable storage media 28 may also include floppy disks, CD ROM, and the like.

In a typical application, ECM 20 processes inputs from engine sensors 22, and vehicle sensors/switches 24 by executing instructions stored in computer-readable storage media 28 to generate appropriate output signals for control of engine 12. Depending upon the particular application, the system 10 may include various types of sensors to monitor engine and vehicle operating conditions. For example, variable reluctance sensors may be used to monitor crankshaft position and/or engine speed. Variable capacitance sensors may be used to monitor various pressures such as barometric air, manifold, oil gallery, and optional pump pressures. Variable resistance sensors may be used to monitor positions such as a throttle (accelerator foot pedal) position. Magnetic pick-up sensors may be used to sense vehicle speed, accumulate trip distance, and for various other vehicle features. Likewise, thermistors may be used to monitor various temperatures such as coolant, oil, and ambient air temperatures, for example. In one embodiment of the present invention, engine sensors 22 include a timing reference sensor (TRS) 40 which provides an indication of the crankshaft position and may be used to determine engine speed. An oil pressure sensor (OPS) 42 and oil temperature sensor (OTS) 44 are used to monitor the pressure and temperature of the engine oil, respectively.

An air temperature sensor (ATS) 46 is used to provide an indication of the current intake air temperature. A turbo boost sensor (TBS) 48 is used to provide an indication of the boost pressure of a turbocharger. Coolant temperature sensor (CTS) 50 is used to provide an indication of the coolant temperature.

Depending upon the particular engine configuration and application, various additional sensors may be included. For example, engines utilizing a common rail fuel system may include a corresponding fuel pressure sensor (CFPS) 52. Similarly, an intercooler coolant pressure sensor (ICPS) 54 and temperature sensor (ICTS) 56 may be provided to sense the pressure and temperature of the intercooler coolant. Engine 12 also preferably includes a fuel temperature sensor (FTS) 58 and a synchronous reference sensor (SRS) 60. SRS 60 provides an indication of a specific cylinder in the firing order for engine 12. This sensor may be used to coordinate or synchronize control of a multiple-engine configuration such as is used in some stationary generator applications.

Engine 12 may also include an oil level sensor (OLS) 62 to provide various engine protection features related to a low oil level. A fuel restriction sensor (FRS) 64 may be used to monitor a fuel filter and provide a warning for preventative maintenance purposes. A fuel pressure sensor (FPS) 68 provides an indication of fuel pressure to warn of impending power loss and engine fueling. Similarly, a crankcase pressure sensor (CPS) 66 provides an indication of crankcase pressure which may be used for various engine protection features by detecting a sudden increase in crankcase pressure indicative of an engine malfunction.

System 10 preferably includes various vehicle sensors/switches 24 to monitor vehicle operating parameters and driver input used in controlling vehicle 14 and engine 12. For example, vehicle sensors/switches 24 may include a vehicle speed sensor (VSS) which provides an indication of the current vehicle speed. A coolant level sensor (CLS) 72 monitors the level of engine coolant in a vehicle radiator. Switches used to select an engine operating mode or otherwise control operation of engine 12 or vehicle 14 may include an engine braking selection switch 74 which preferably provides for low, medium, high, and off selections, cruise control switches 76, 78, and 80, a diagnostic switch 82, and various optional, digital, and/or analog switches 84. ECM 20 also receives signals associated with an accelerator or foot pedal 86, a clutch 88, and a brake 90. ECM 20 may also monitor position of a key switch 92 and a system voltage provided by a vehicle battery 94.

ECM 20 may communicate with various vehicle output devices such as status indicators/lights 96, analog displays 98, digital displays 100, and various analog/digital gauges 102. In one embodiment of the present invention, ECM 20 utilizes an industry standard data link 104 to broadcast various status and/or control messages which may include engine speed, accelerator pedal position, vehicle speed, and the like. Preferably, data link 104 conforms to SAE J1939 and SAE J1587 to provide various service, diagnostic, and control information to other engine systems, subsystems, and connected devices such as display 100.

A service tool 106 may be periodically connected via data link 104 to program selected parameters stored in ECM 20 and/or receive diagnostic information from ECM 20. Likewise, a computer 108 may be connected with the appropriate software and hardware via data link 104 to transfer information to ECM 20 and receive various information relative to operation of engine 12, and/or vehicle 14.

In one embodiment of the present invention, vehicle 14 includes a transceiver 110 connected to an antenna 112 to transmit and receive various information via ECM 20. Transceiver 110 and antenna 112 may be used to track position of vehicle 14 via a GPS system, for example. Alternatively, transceiver 110 and antenna 112 may be used to transmit and receive programming, calibration, and automatic starting information to/from a remotely located control computer. The communication link provided by transceiver 110 and antenna 112 may utilize cellular, satellite, or radio frequency communication systems depending upon the particular application. Likewise, service tool 106 and/or computer 108 may communicate via data link 104 using any of a number of wireless communication technologies.

According to one embodiment of the present invention, system 10 provides a method for controlling engine 12 utilizing ECM 20 in communication with a starter motor and fuel injectors 26 to automatically start engine 12 at a programmable day and/or date and time. ECM 20 preferably determines the current day and/or date and time and compares the current date and time to a previously stored date and time for automatically starting engine 12. ECM 20 determines whether current engine/vehicle operating conditions are acceptable for automatically starting engine 12 and controls the starter motor and fuel injectors 26 to automatically start the engine beginning at the previously stored date and time and continuing for a predetermined time thereafter while the current conditions are acceptable for automatically starting engine 12. The process is preferably repeated a predetermined number of times until the engine has started.

Engine/vehicle conditions which may be monitored to determine whether current conditions are acceptable for automatically starting engine 12 may include determining whether ignition switch 92 is in an "on" position. For vehicle or construction equipment applications, ECM 20 may determine whether vehicle 14 is stationary prior to attempting an automatic start of engine 12. This may be determined by monitoring the status of the parking brake, or by determining the vehicle speed is below a predetermined or programmable threshold, for example. Determining whether current conditions are acceptable for automatically starting the engine may also include monitoring various engine, vehicle, and/or ambient temperature conditions and related parameters such as fuel temperature, coolant temperature, oil temperature, battery voltage, ambient temperature, and the like.

The present invention preferably includes various security features to prevent unauthorized use of the engine/vehicle after an automatic start has been performed. For example, system 10 may prevent vehicle 14 from being moved after automatically starting engine 12 without appropriate authorization which may be obtained by inserting a key such as ignition key 92, or entering a password, for example. In one embodiment, digital input/output display 100 may be used to enter an appropriate password which is communicated to ECM 20. Prior to entry of a password or use of an appropriate key, ECM 20 may take appropriate action to inhibit or prevent unauthorized use of engine 12 and/or vehicle 14. This may include automatically stopping engine 12, limiting vehicle speed to a predetermined level, such as 3 mph, limiting distance traveled by vehicle 14, limiting engine torque, and the like. Distance traveled may be measured using the vehicle speed sensor or using transceiver 110 and antenna 112, for example.

Figure 2:
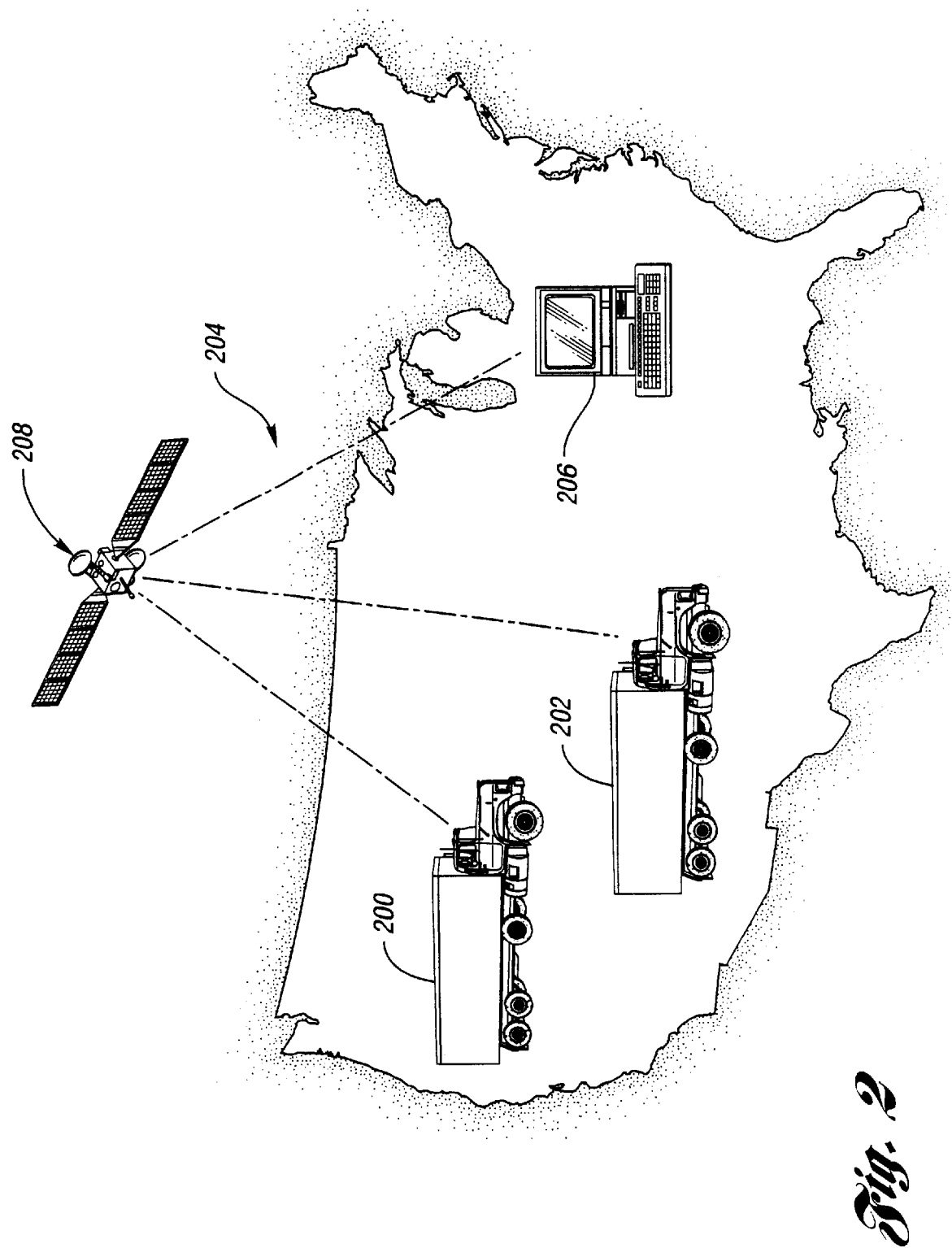
FIG. 2 illustrates coordinated control/programming of a plurality of vehicles/engines for automatically starting engines at a programmable day/date and time according to one embodiment of the present invention.

FIG. 2 illustrates coordinated control/programming of a plurality of vehicles/engines for automatically starting engines at a programmable day/date and time according to one embodiment of the present invention. As with the embodiments illustrated with reference to FIG. 1, the embodiments illustrated and described with reference to FIG. 2 include various on-highway, construction and industrial, and stationary applications although illustrated in the on-highway context. According to the present invention, a plurality of vehicles, such as trucks 200, 202 are controlled via a signal 204 transmitted from a remotely located computer 206 to automatically start the engines at a programmable day and/or date and time. In these embodiments, signal 204 is transmitted by remotely located computer 206 to vehicles 200, 202. Signal 204 may include a schedule of days and/or dates and times to automatically start vehicles 200, 202. Alternatively, or in combination, signal 204 may include an enabling signal which allows the engines of vehicles 200, 202 to automatically start at a previously programmed day/date and time. Signal 204 may be transmitted via any wireless communication system such as a satellite 208. Depending upon the particular communication system utilized, the distance between vehicles 200, 202 and remotely located computer 206 may vary greatly. For example, a typical application for automatically starting a plurality of vehicles according to the present invention may be used where a fleet of vehicles is stated at a similar day/date and time. For example, a fleet of busses which may be dispatched from a common staging area, construction equipment located at a particular construction site, tractor semi-trailer vehicles scheduled to depart at similar times (and therefore desire automatic starting some time prior to departure), and the like. As such, the security features of the present invention may be limited to a particular geographic region which may be only a few hundred yards or may extend several miles or more. Limiting the speed of vehicles prior to entry of authorization information or a key would allow vehicles to be repositioned within a staging area for refueling, loading/unloading, and the like. Similarly, limiting distance traveled by a vehicle without entering authorization information would also provide similar advantages while reducing or eliminating unauthorized use of the vehicle after an automatic engine start.

Figure 3:
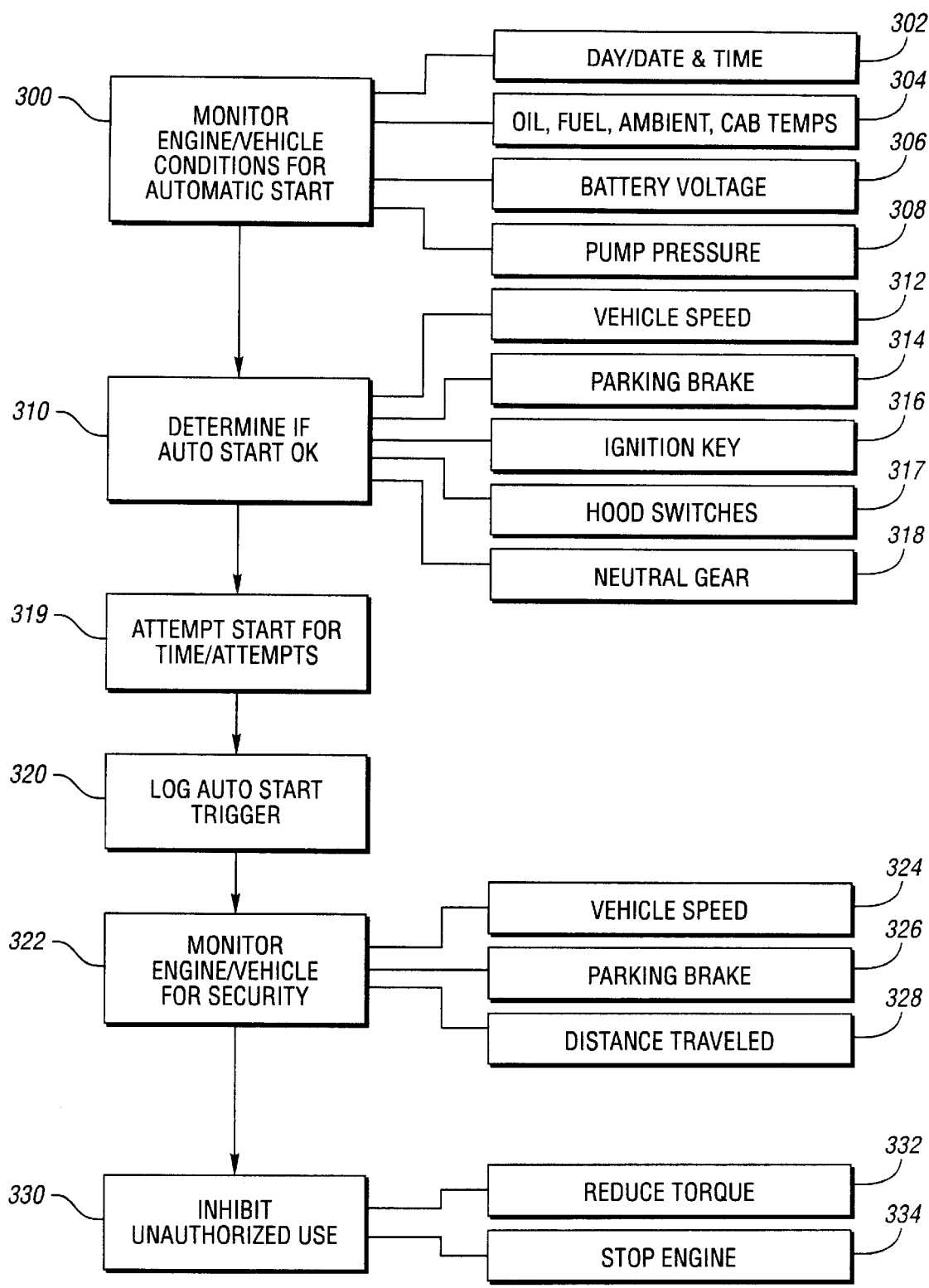
FIG. 3 is a flow chart illustrating operation of a system or method for automatically starting an engine according to one embodiment of the present invention.

Referring now to FIG. 3, a block diagram illustrating operation of a system or method for controlling an internal combustion engine according to the present invention is shown. As will be appreciated by one of ordinary skill in the art, the block diagram of FIG. 3 represents control logic which may be implemented or effected in hardware, software, or a combination of hardware and software. The various functions are preferably effected by a programmed microprocessor, such as included in the DDEC controller manufactured by Detroit Diesel Corporation, Detroit, Mich. Of course, control of the engine/vehicle may include one or more functions implemented by dedicated electric, electronic, or integrated circuits. As will also be appreciated by those of skill in the art, the control logic may be implemented using any of a number of known programming and processing techniques or strategies and is not limited to the order or sequence illustrated in FIG. 3. For example, interrupt or event driven processing is typically employed in real-time control applications, such as control of an engine or vehicle rather than a purely sequential strategy as illustrated. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the features and advantages of the present invention. The illustrated functions may be modified, or in some cases omitted, without departing from the spirit or scope of the present invention.

In various embodiments of the present invention, the control logic illustrated is implemented primarily in software and is stored in computer readable storage media within the ECM. As one of ordinary skill in the art will appreciate, various control parameters, instructions, and calibration information stored within the ECM may be selectively modified by the vehicle owner/operator while other information is restricted to authorized service or factory personnel. The computer readable storage media may also be used to store engine/vehicle operating information for vehicle owners/operators and diagnostic information for maintenance/service personnel.

Block 300 of FIG. 3 represents monitoring engine/vehicle conditions relative to automatically starting the engine. Depending upon the particular application, the system may include one or more event triggers which initiate an automatic engine start. For example, the current day/date and time as represented by block 302 may be used to automatically start the engine. The automatic start may be programmed by the engine operator, a fleet owner/operator, or may be remotely programmed as described above. Other events which may trigger an automatic engine start include various engine/vehicle temperatures such as oil temperature, fuel temperature, ambient temperature, and/or cab or coach temperature as represented by block 304. Likewise, battery voltage may be monitored to trigger an automatic start as represented by block 306. For applications utilizing an auxiliary pump, such as irrigation systems or fire truck applications and the like, pump pressure may trigger an automatic engine start as represented by block 308. Various other engine/vehicle conditions may trigger an automatic engine start depending upon the particular application. Likewise, more than one condition may be required to trigger an automatic engine start.

Block 310 of FIG. 3 represents determining whether conditions are acceptable for automatically starting the engine. Engine/vehicle parameters which may be monitored include vehicle speed 312, parking brake status 314, ignition key position 316, hood switches 317, and/or neutral gear 318. Vehicle speed 312 and/or parking brake status 314 may be monitored to determine whether the vehicle/equipment is stationary prior to performing an automatic start. Ignition key 316 may be used as a master override to disable automatic starts by turning ignition key to the "off" position and/or removing the ignition key. Alternatively, a key-switch may be used for security reasons as described below with another push button or switch used to select automatic starting and/or manually start the engine. Hood switches 317 indicate that the vehicle hood is closed so an automatic start is not performed while the engine is being serviced, for example. Neutral gear 318 is monitored to assure that the transmission (if any) is in neutral gear prior to an automatic start. This feature may also be used as a security feature to keep the transmission in neutral and make it more difficult to move the vehicle/equipment without proper authorization.

While conditions are determined to be acceptable for automatically starting the engine, block 319 repeatedly attempts to start the engine until the engine starts or a predetermined number of attempts have been completed. The starter motor may be energized for a predetermined period of time while attempting to start the engine. If the engine does not start, a pause or delay between starting attempts may be imposed to prevent overheating of the starter motor. Automatic starting of the engine may be limited to a predetermined period of time or number of attempts depending upon the particular application. Block 320 represents recording or logging the condition or conditions which triggered the automatic engine start. This information may be stored in the ECM and/or transmitted to a central computer for monitoring automatic engine starts.

After an automatic engine start, block 322 monitors the engine/vehicle for security to inhibit unauthorized use as represented by block 330. Block 322 may include monitoring vehicle speed 324, parking brake status 326, and/or distance traveled 328. Block 330 may inhibit unauthorized use by reducing torque 332 or automatically stopping the engine 334 for example. Torque reduction as represented by block 332 may be used to limit the vehicle speed to a predetermined or programmable threshold which would allow the vehicle/equipment to be moved for fueling, loading/unloading, or the like but would hamper efforts to steal the vehicle. Preferably, the system requires entry of a password or combination to disable the automatic start security features. A password/combination may be entered by various switches or programmable input/output displays such as display 100 (FIG. 1). Alternatively, the security features may require an ignition key or other key-switch operation prior to being fully functional after an automatic start.

As such, the present invention provides a system and method for automatically and/or remotely starting an engine with various advantages relative to previous automatic/remote starting systems. The present invention allows an engine to be automatically started based on a signal received from a remotely located computer. The invention also provides safety and security features to prevent undesired engine starts and/or unauthorized operation of vehicles/equipment after automatic starting while providing flexibility for limited use of the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an internal combustion engine installed in a vehicle having an electronic engine controller in communication with a starter motor and a plurality of fuel injectors, the electronic engine controller including a programmable memory for storing instructions and parameters for controlling the engine, the method comprising:

determining a current day and/or date and time;

comparing the current day and/or date and time to a day and/or date and time previously stored in the programmable memory for automatically starting the engine;

determining whether current conditions are acceptable for automatically starting the engine including determining whether the vehicle is stationary; and controlling the starter motor and fuel injectors to automatically start the engine beginning at the previously stored day and/or date and time for automatically starting the engine and continuing for a predetermined time thereafter while the current conditions are acceptable for automatically starting the engine or until the engine has started.

2. The method of claim 1 wherein the step of determining whether the vehicle is stationary comprises determining whether a parking brake is set.

3. The method of claim 1 wherein the step of determining whether the vehicle is stationary comprises monitoring a vehicle speed sensor signal.

4. The method of claim 3 wherein monitoring the vehicle speed sensor signal comprises comparing vehicle speed to a selectable threshold and determining conditions are acceptable for automatically starting the engine if the vehicle speed is less than the selectable threshold.

5. A method for controlling an internal combustion engine installed in a vehicle having an electronic engine controller in communication with a starter motor and a plurality of fuel injectors, the electronic engine controller including a programmable memory for storing instructions and parameters for controlling the engine, the method comprising:

determining a current day and/or date and time;

comparing the current day and/or date and time to a day and/or date and time previously stored in the programmable memory for automatically starting the engine;

determining whether current conditions are acceptable for automatically starting the engine;

controlling the starter motor and fuel injectors to automatically start the engine beginning at the previously stored day and/or date and time for automatically starting the engine and continuing for a predetermined time thereafter while the current conditions are acceptable for automatically starting the engine or until the engine has started; and controlling the engine to limit vehicle speed until a valid password is entered.

6. The method of claim 5 wherein controlling the engine to limit vehicle speed comprises reducing available engine torque when vehicle speed exceeds a programmable threshold.

7. A method for controlling an internal combustion engine having an electronic engine controller in communication with a starter motor and a plurality of fuel injectors, the electronic engine controller including a programmable memory for storing instructions and parameters for controlling the engine, the method comprising:

determining a current day and/or date and time;

comparing the current day and/or date and time to a day and/or date and time previously stored in the programmable memory for automatically starting the engine;

determining whether current conditions are acceptable for automatically starting the engine;

attempting to automatically start the engine beginning at the previously stored day and/or date and time for automaticlaly starting the engine and continuing for a predetermined time thereafter while the current conditions are acceptable for automatically starting the engine or until the engine has started; and automatically stopping the engine if the vehicle is moved without entry of a valid authorization code.

8. A method for controlling an internal combustion engine installed in a vehicle having an electronic engine controller in communication with a starter motor and a plurality of fuel injectors, the electronic engine controller including a programmable memory for storing instructions and parameters for controlling the engine, the method comprising:

determining a current day and/or date and time;

comparing the current day and/or date and time to a day and/or date and time previously stored in the programmable memory for automatically starting the engine;

determining whether current conditions are acceptable for automatically starting the engine;

controlling the starter motor and fuel injectors to automatically start the engine beginning at the previously stored day and/or date and time for automatically starting the engine and continuing for a predetermined time thereafter while the current conditions are acceptable for automatically starting the engine or until the engine has started;

attempting to automatically start the engine when any one of the battery voltage, oil temperature, fuel temperature and ambient temperature drops below a programmable value without regard to the current date and time; and storing an indication of the current date and time and which condition triggered an automatic engine start when an automatic start is attempted.

9. A method for controlling an internal combustion engine installed in a vehicle having an electronic engine controller in communication with a starter motor and a plurality of fuel injectors, the electronic engine controller including a programmable memory for storing instructions and parameters for controlling the engine, the method comprising:

determining a current day and/or date and time;

receiving a wireless signal transmitted from a control computer to determine the date and time for automatically starting the engine;

comparing the current day and/or date and time to a day and/or date and time previously stored in the programmable memory for automatically starting the engine;

determining whether current conditions are acceptable for automatically starting the engine including determining whether the vehicle is stationary; and controlling the starter motor and fuel injectors to automatically start the engine beginning at the previously stored day and/or date and time for automatically starting the engine and continuing for a predetermined time thereafter while the current conditions are acceptable for automatically starting the engine or until the engine has started.

10. The method of claim 9 wherein the step of controlling comprises:

energizing the starter for a first period;

pausing for a second period;

repeating the steps of energizing and pausing a predetermined number of times until the engine starts or the predetermined time has elapsed.

11. The method of claim 9 wherein the step of determining whether current conditions are acceptable comprises determining whether an ignition switch is on.

12. The method of claim 9 wherein the step of determining whether current conditions are acceptable for automatically starting the engine comprises requiring entry of a password.

13. The method of claim 9 further comprising:

monitoring at least one condition selected from a group including battery voltage, oil temperature, fuel temperature, and/or ambient temperature; and automatically starting the engine when any one of the battery voltage, oil temperature, fuel temperature, and ambient temperature drops below a programmable value without regard to the current date and time.

14. A method for controlling an internal combustion engine installed in a vehicle having an electronic engine controller in communication with a starter motor and a plurality of fuel injectors, the electronic engine controller including a programmable memory for storing instructions and parameters for controlling the engine, the method comprising:

determining a current day and/or date and time;

comparing the current day and/or date and time to a day and/or date and time previously stored in the programmable memory for automatically starting the engine;

determining whether current conditions are acceptable for automatically starting the engine;

automatically starting the engine at the previously stored day and/or date and time; and wherein the previously stored date and time is transmitted by a remotely located control computer.

15. A method for controlling a plurality of vehicles to automatically start the engines, the method comprising:

transmitting a signal from a remotely located computer at a programmable day and/or date and time to the plurality of vehicles to enable the plurality of engines to start;

for each engine:
  determining whether conditions are acceptable for automatically starting the engine; and
  repeatedly attempting to start the engine while conditions are acceptable for automatically starting the engine until the engine starts or a predetermined number of attempts have been completed.

16. The method of claim 15 wherein the step of transmitting comprises transmitting a schedule having a plurality of automatic engine starting days or dates and times to the plurality of engines.

17. The method of claim 15 wherein the step of determining whether conditions are acceptable comprises determining whether a parking brake is set.

18. The method of claim 15 wherein the step of determining whether conditions are acceptable comprises monitoring vehicle speed.

19. The method of claim 15 further comprising limiting vehicle speed after automatic starting of the engine until a password is entered.

20. The method of claim 19 wherein vehicle speed is limited to substantially zero.

21. The method of claim 15 further comprising limiting vehicle speed after automatic starting of the engine until a switch requiring a key for activation has been activated.

22. The method of claim 15 further comprising limiting distance traveled by the vehicle after automatically starting the engine.

23. The method of claim 22 wherein limiting distance traveled by the vehicle comprises limiting distance traveled as determined by number of revolutions detected by a vehicle speed sensor.

24. The method of claim 22 wherein limiting distance traveled by the vehicle comprises limiting distance traveled as determined by a signal transmitted to and/or from the vehicle.

25. The method of claim 22 wherein limiting distance traveled by the vehicle comprises limiting distance traveled as determined by a GPS system.

26. Apparatus for controlling an internal combustion engine having a starter motor and a plurality of fuel injectors, the apparatus comprising:

an engine controller including a programmable memory for storing data representing instructions and parameters for controlling the engine, the instructions including instructions for determining a current date and time, comparing the current date and time to the date and time received via a wireless signal transmitted from a control computer and previously stored in the programmable memory, determining whether current conditions are acceptable for automatically starting the engine, and controlling the starter motor and fuel injectors to automatically start the engine beginning at the previously stored date and time and continuing for a predetermined time thereafter while the current conditions are acceptable for automatically starting the engine or until the engine has started.

27. A computer readable storage medium having stored data representing instructions executable by a computer to control an internal combustion engine, the computer readable storage medium comprising:

instructions for determining a current day and/or date and time;

instructions for storing a date and time for automatically starting the engine received via a wireless signal transmitted from a control computer;

instructions for comparing the current day and/or date and time to the day and/or date and time previously stored in the programmable memory for automatically starting the engine;

instructions for determining whether current conditions are acceptable for automatically starting the engine; and instructions for controlling the starter motor and fuel injectors to automatically start the engine beginning at the previously stored day and/or date and time for automatically starting the engine and continuing for a predetermined time thereafter while the current conditions are acceptable for automatically starting the engine or until the engine has started.

28. A computer readable storage medium having stored data representing instructions executable by a computer to control an internal combustion engine, installed in a vehicle the computer readable storage medium comprising:

instructions for determining a current day and/or date and time;

instructions for comparing the current day and/or date and time to a day and/or date and time previously stored in the programmable memory for automatically starting the engine;

instructions for determining whether current conditions are acceptable for automatically starting the engine;

instructions for attempting to automatically start the engine beginning at the previously stored day and/or date and time for automatically starting the engine and continuing for a predetermined time thereafter while the current conditions are acceptable for automatically starting the engine or until the engine has started; and instructions for controlling the engine to limit vehicle speed until a valid password is entered.

29. A computer readable storage medium having stored data representing instructions executable by a computer to control an internal combustion engine, installed in a vehicle the computer readable storage medium comprising:

instructions for determining a current day and/or date and time;

instructions for comparing the current day and/or date and time to a day and/or date and time previously stored in the programmable memory for automatically starting the engine;

instructions for determining whether current conditions are acceptable for automatically starting the engine;

instructions for attempting to automatically start the engine beginning at the previously stored day and/or date and time for automaticlaly starting the engine and continuing for a predetermined time thereafter while the current conditions are acceptable for automatically starting the engine or until the engine has started; and instructions for automatically stopping the engine if the vehicle is moved without entry of a valid authorization code.

* * * * *

UNITED STATES PATENT AND TRADEMARK OFFICE
CERTIFICATE OF CORRECTION

PATENT NO. : 6,351,703 B1  
DATED : February 26, 2002  
INVENTOR(S) : Richard M. Avery, Jr.

It is certified that error appears in the above-identified patent and that said Letters Patent is hereby corrected as shown below:

<u>Column 9,</u>
Line 50, please replace "automaticlaly" with -- automatically --.

Signed and Sealed this

Fourth Day of June, 2002

Attest:

JAMES E. ROGAN  
Attesting Officer *Director of the United States Patent and Trademark Office*